L. L. KNOX.
HOLLOW SHEET METAL STRUCTURE.
APPLICATION FILED APR. 17, 1915.
1,168,648.
Patented Jan. 18, 1916.
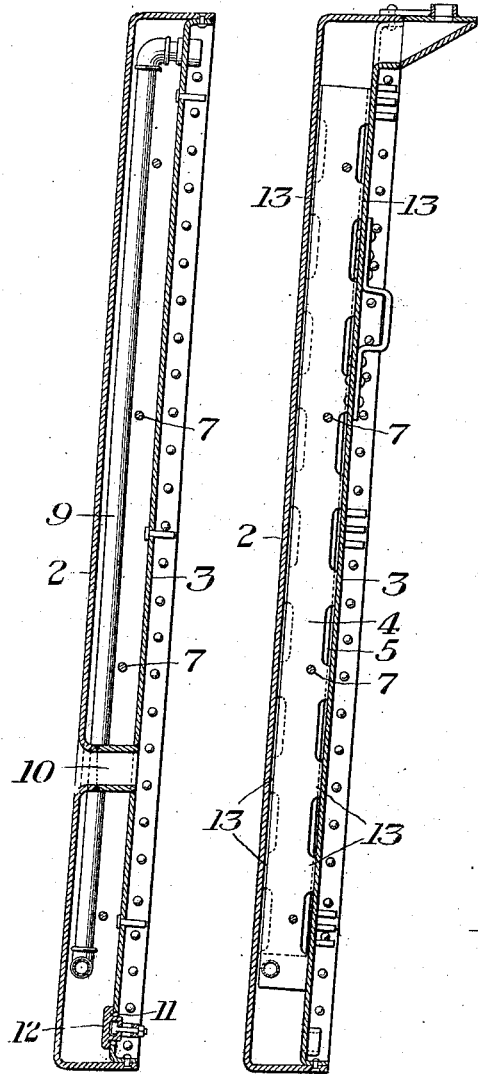
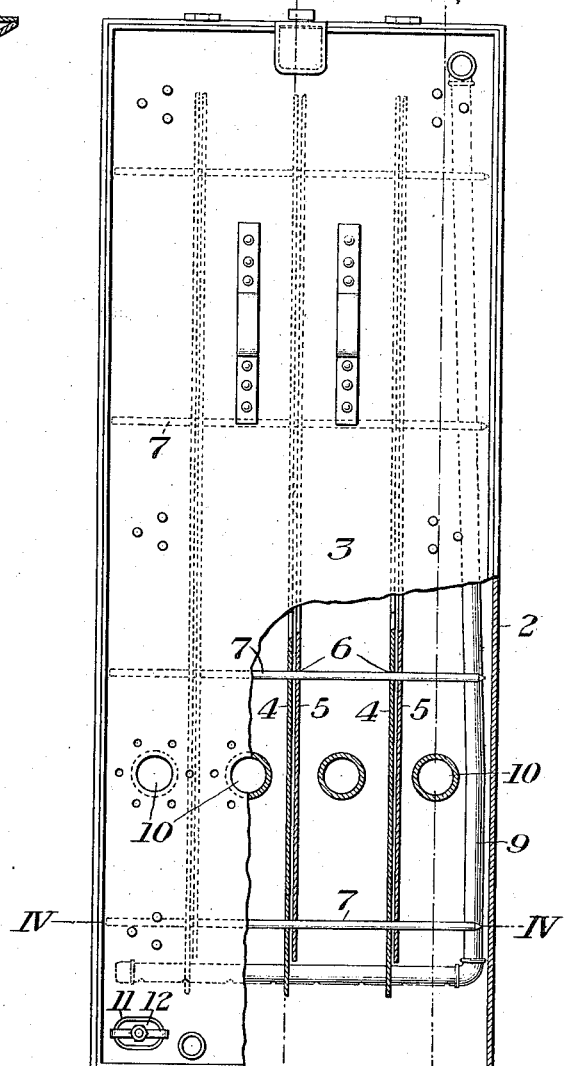
WITNESSES
INVENTOR

025# UNITED STATES PATENT OFFICE.

LUTHER L. KNOX, OF AVALON, PENNSYLVANIA, ASSIGNOR TO KNOX PRESSED & WELDED STEEL COMPANY, OF PITTSBURGH, PENNSYLVANIA, A CORPORATION OF PENNSYLVANIA.

HOLLOW SHEET-METAL STRUCTURE.

1,168,648.     Specification of Letters Patent.     Patented Jan. 18, 1916.

Application filed April 17, 1915. Serial No. 22,078.

*To all whom it may concern:*

Be it known that I, LUTHER L. KNOX, a citizen of the United States, residing at Avalon, Allegheny county, Pennsylvania, have invented a new and useful Improvement in Hollow Sheet-Metal Structures, of which the following is a full, clear, and exact description, reference being had to the accompanying drawings, forming part of this specification, in which—

Figure 1 is a plan view, partly broken away, of a hollow sheet metal structure embodying my invention. Figs. 2, 3 and 4 are sections taken, respectively, on the lines II—II, III—III and IV—IV of Fig. 1.

My invention has relation to hollow sheet metal structures; and is designed to provide a structure of this character in which the stay bolts usually employed for connecting and bracing the walls of the structure are eliminated. These bolts are objectionable for the reason that they make it necessary to perforate both the walls of the structure which they connect, and thereby provide a large number of possible weak spots in the structure. In lieu of these bolts I employ internal spacers of novel form and arrangement, and which do not require the piercing or perforation of either wall of the structure.

In the accompanying drawings I have shown my invention as applied to a hollow sheet metal water jacket section, such as are employed for water jacketing furnaces. The structure consists of the two plates or sheets 2 and 3, which are pressed to shape and are either welded or riveted at their meeting edges, in any well known manner. Prior to assembling the structure, I weld to each of the plates or sheets a plurality of spacer strips, such as indicated at 4 and 5. The strips 4 are welded to one of the plates or sheets and the strips 5 to the other one. These strips are so placed on the two sheets or plates that when the latter are assembled to form the structure the two sets of strips come adjacent to each other in pairs in the manner shown in Fig. 4. I provide these strips with registering perforations 6 through which key rods 7 may be inserted for the purpose of securely connecting them. These key rods may be inserted through openings formed at 8 in the sides of the structure, and which, after the insertion of the keys, may be closed by plugging or welding.

9 designates a water supply pipe for supplying water to the interior of the structure.

10 designates twyer holes, and 11 hand or clean-out holes having the removable cover plates 12.

For the purpose of permitting a more efficient water circulation, each of the strips 4 and 5, instead of being welded continuously along one of its edges, may be formed with a plurality of projections 13 at one or both edges, these projections forming the welding points or surfaces. The welding at these spaced projections only also renders the structure more elastic under contraction and expansion stresses.

I desire it understood that my invention is applicable to various other forms of hollow sheet metal structures, the particular structures shown being illustrative only. The number and arrangement of the spacers may be widely varied to suit the particular structure in any case, and the form of the spacers may also be changed.

I claim:

1. A hollow sheet metal structure provided with internal stay strips secured to opposite walls thereof and loosely overlapping each other, each strip being substantially equal in width to the distance between said opposite walls, and key means engaging said strips to tie them against relative movement in an edgewise direction, substantially as described.

2. A hollow sheet metal structure provided with overlapping internal stay strips, the two strips being welded at respectively opposite edges to the opposite walls of the structure, and each strip having its welded edge formed by a series of spaced projections, and key means engaging said strips, substantially as described.

In testimony whereof, I have hereunto set my hand.

LUTHER L. KNOX.

Witnesses:
   GEO. B. BLEMING,
   W. C. LYON.